US009501441B2

(12) United States Patent
Nelogal et al.

(10) Patent No.: US 9,501,441 B2
(45) Date of Patent: Nov. 22, 2016

(54) MECHANISM TO BOOT MULTIPLE HOSTS FROM A SHARED PCIE DEVICE

(71) Applicant: Dell Products, LP, Round Rock, TX (US)

(72) Inventors: Chandrashekar Nelogal, Round Rock, TX (US); William E. Lynn, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 388 days.

(21) Appl. No.: 14/107,312

(22) Filed: Dec. 16, 2013

(65) Prior Publication Data

US 2015/0169331 A1    Jun. 18, 2015

(51) Int. Cl.
G06F 13/00    (2006.01)
G06F 13/40    (2006.01)
G06F 9/445    (2006.01)
G06F 9/44    (2006.01)

(52) U.S. Cl.
CPC .......... *G06F 13/4022* (2013.01); *G06F 8/665* (2013.01); *G06F 9/4401* (2013.01)

(58) Field of Classification Search
CPC ... G06F 13/4022; G06F 9/4401; G06F 8/665
See application file for complete search history.

(56) References Cited

U.S. PATENT DOCUMENTS

| 7,136,993 | B2 | 11/2006 | Bolen et al. | |
|---|---|---|---|---|
| 7,478,178 | B2 * | 1/2009 | Torudbakken | G06F 13/4022 370/230 |
| 7,502,919 | B2 | 3/2009 | Bolen et al. | |
| 7,603,500 | B2 | 10/2009 | Brahmaroutu | |
| 7,610,431 | B1 * | 10/2009 | Watkins | G06F 13/4022 710/100 |
| 7,934,033 | B2 * | 4/2011 | Malwankar | G06F 13/404 710/104 |
| 8,370,534 | B2 | 2/2013 | Khatri et al. | |
| 8,521,941 | B2 * | 8/2013 | Regula | G06F 13/404 710/105 |
| 8,539,116 | B2 | 9/2013 | Kotzur et al. | |
| 8,990,459 | B2 * | 3/2015 | Kanigicherla | G06F 9/5011 710/108 |
| 8,995,302 | B1 * | 3/2015 | Brown | H04L 49/00 370/254 |
| 9,223,734 | B2 * | 12/2015 | Subramaniyan | G06F 13/4022 |
| 2005/0273587 | A1 | 12/2005 | Wynn et al. | |
| 2006/0085690 | A1 | 4/2006 | Bolen et al. | |
| 2006/0233164 | A1 | 10/2006 | Brahmaroutu et al. | |
| 2007/0064623 | A1 | 3/2007 | Brahmaroutu | |
| 2007/0300241 | A1 | 12/2007 | Prakash et al. | |
| 2008/0002694 | A1 | 1/2008 | Brahmaroutu | |
| 2008/0005372 | A1 | 1/2008 | Bolen et al. | |
| 2009/0248949 | A1 | 10/2009 | Khatri et al. | |
| 2009/0287916 | A1 | 11/2009 | Jaber et al. | |
| 2009/0292960 | A1 | 11/2009 | Haraden et al. | |
| 2010/0125653 | A1 * | 5/2010 | Cherian | G06F 13/4004 709/223 |
| 2010/0175064 | A1 * | 7/2010 | Brahmaroutu | G06F 9/45558 718/1 |
| 2010/0306434 | A1 | 12/2010 | Dube et al. | |
| 2011/0016235 | A1 * | 1/2011 | Brinkmann | G06F 13/404 710/8 |
| 2011/0138082 | A1 | 6/2011 | Khatri et al. | |

(Continued)

FOREIGN PATENT DOCUMENTS

WO    WO 2013/0101180 A1    7/2013

*Primary Examiner* — Jing-Yih Shyu
(74) *Attorney, Agent, or Firm* — Larson Newman, LLP

(57) ABSTRACT

A PCIe switch including a memory and a processor. The processor is operable to receive a transaction from an information handling system to an endpoint device, determine that the transaction is a request to receive firmware code from the endpoint device, block the transaction from being issued to the endpoint device, and provide the firmware code to the information handling system from the memory.

14 Claims, 5 Drawing Sheets

(56) References Cited

U.S. PATENT DOCUMENTS

| | | | |
|---|---|---|---|
| 2012/0079136 A1* | 3/2012 | Kotzur | G06F 13/385 710/8 |
| 2012/0110233 A1* | 5/2012 | Higuchi | G06F 13/4022 710/313 |
| 2012/0167085 A1* | 6/2012 | Subramaniyan | G06F 13/105 718/1 |
| 2013/0254453 A1* | 9/2013 | Sato | G06F 13/4022 710/317 |
| 2014/0331223 A1* | 11/2014 | Lee | G06F 13/105 718/1 |

* cited by examiner

MECHANISM TO BOOT MULTIPLE HOSTS FROM A SHARED PCIE DEVICE

FIELD OF THE DISCLOSURE

This disclosure relates generally to information handling systems, and more particularly relates to a mechanism to boot multiple hosts from a shared PCIe device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purpose of this disclosure an information handling system can be implemented on one or more information handling system. An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Figure 1:
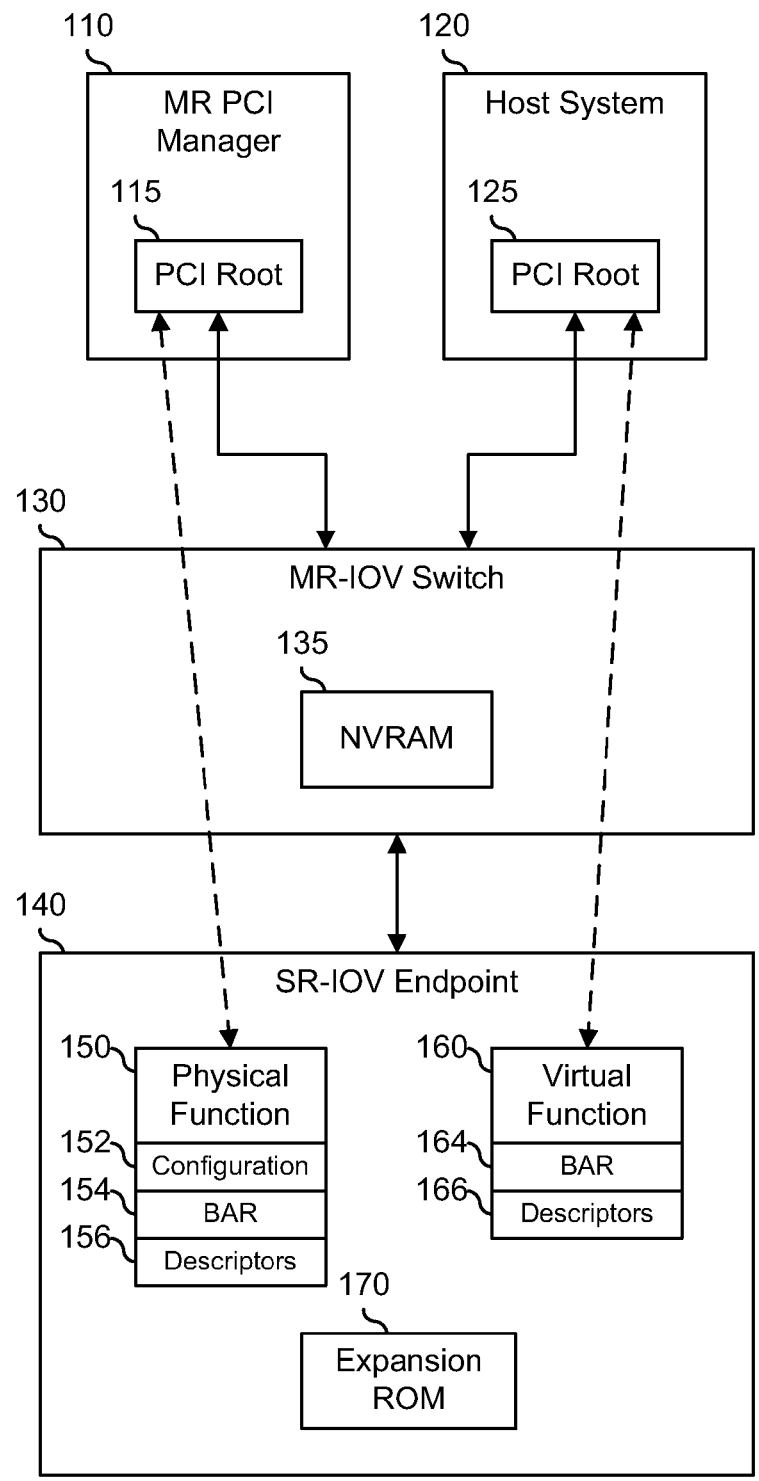
FIG. 1 is a block diagram illustrating a virtualized environment according to an embodiment of the present disclosure.

FIG. 1 illustrates an embodiment of a virtualized environment 100 including a multi-root (MR) Peripheral Connect Interface manager (PCIM) 110, one or more host system 120, an MR input/output virtualization (IOV) switch 130, and a single-root (SR) IOV endpoint 140. MR-PCIM 110 includes a PCI root complex 115 that is operable to connect a processor complex of MR-PCIM 110 to a PCI Express (PCIe) switch fabric such as MR-IOV switch 130, and thereby to gain access to the functionality of SR-IOV endpoint 140. Host system 120 includes a PCI root complex 125 similar to PCI root complex 115. MR-IOV switch 130 includes a non-volatile random access memory (NVRAM) 135, such as a flash device or other re-writeable memory device, for storing expansion ROM firmware from SR-IOV endpoint 140, as described further, below. In a particular embodiment, MR-IOV switch 130 operates in compliance with the Multi-Root I/O Virtualization and Sharing 1.0 specification and SR-IOV endpoint 140 operates in compliance with the Single-Root I/O Virtualization and Sharing 1.1 specification.

SR-IOV endpoint 140 includes a physical function 150, one or more virtual function 160, and an expansion ROM 170. Physical function 150 operates to provide an interface through which PCI root complex 115 accesses the functions of SR-IOV endpoint 140. In particular, physical function 150 provides PCI root complex 115 with access to PCI configuration space 152, to base address registers (BAR) 154, and to descriptor fields 156. PCI configuration space 152 provides memory-mapped locations through which MR PCIM 110 can configure SR-IOV endpoint 140. BAR 154 and descriptors 156 operate to permit data to flow between PCI root complex 115 and SR-IOV endpoint 140. Physical function 150 is associated with Function 0 of SR-IOV endpoint 140. The skilled artisan will understand that expansion ROM 170 represents one or more of an option ROM, such as may be included on an add-in device, a Unified Extensible Firmware Interface (UEFI) driver, or another type of firmware function.

Virtual function 160 operates to provide an interface through which PCI root complex 125 accesses the functions of SR-IOV endpoint 140. In particular, virtual function 160 provides PCI root complex 125 with access to BAR 164, and to descriptor fields 166. BAR 164 and descriptors 166 operate to permit data to flow between PCI root complex 125 and SR-IOV endpoint 140. Thus host system 120 is distinguished from MR PCIM 110 in that the host system does not have access to physical function 150, and thus cannot access expansion ROM 170. Virtual function 160 is associated with functions other than Function 0 of SR-IOV endpoint 140. The skilled artisan will understand that the above description is simplified, that a virtual function may include some subset of the functions available in a physical function's configuration space, but that the subset of functions will not include an association with an expansion ROM.

Expansion ROM 170 is a non-volatile memory for storing firmware code for SR-IOV endpoint 140. The firmware code operates to receive low-level commands, such as Bios calls, and to translate the commands into actions performed by SR-IOV endpoint 140. Thus MR-PCIM 110 or host system 120 can execute the firmware code from expansion ROM 170 to access the functions of SR-IOV endpoint 140. However, the base address for expansion ROM 170 is included in PCI configuration space 152. Therefore only MR PCIM 110 can directly obtain the firmware code from expansion ROM 170. Note that the Single-Root I/O Virtualization and Sharing 1.1 specification defines that expansion ROM images are applicable to a particular PCIe peripheral device in its entirety and are thereby associated with the physical function. As such, the expansion ROM images are not typically applicable to or associated with virtual functions.

Figure 2:
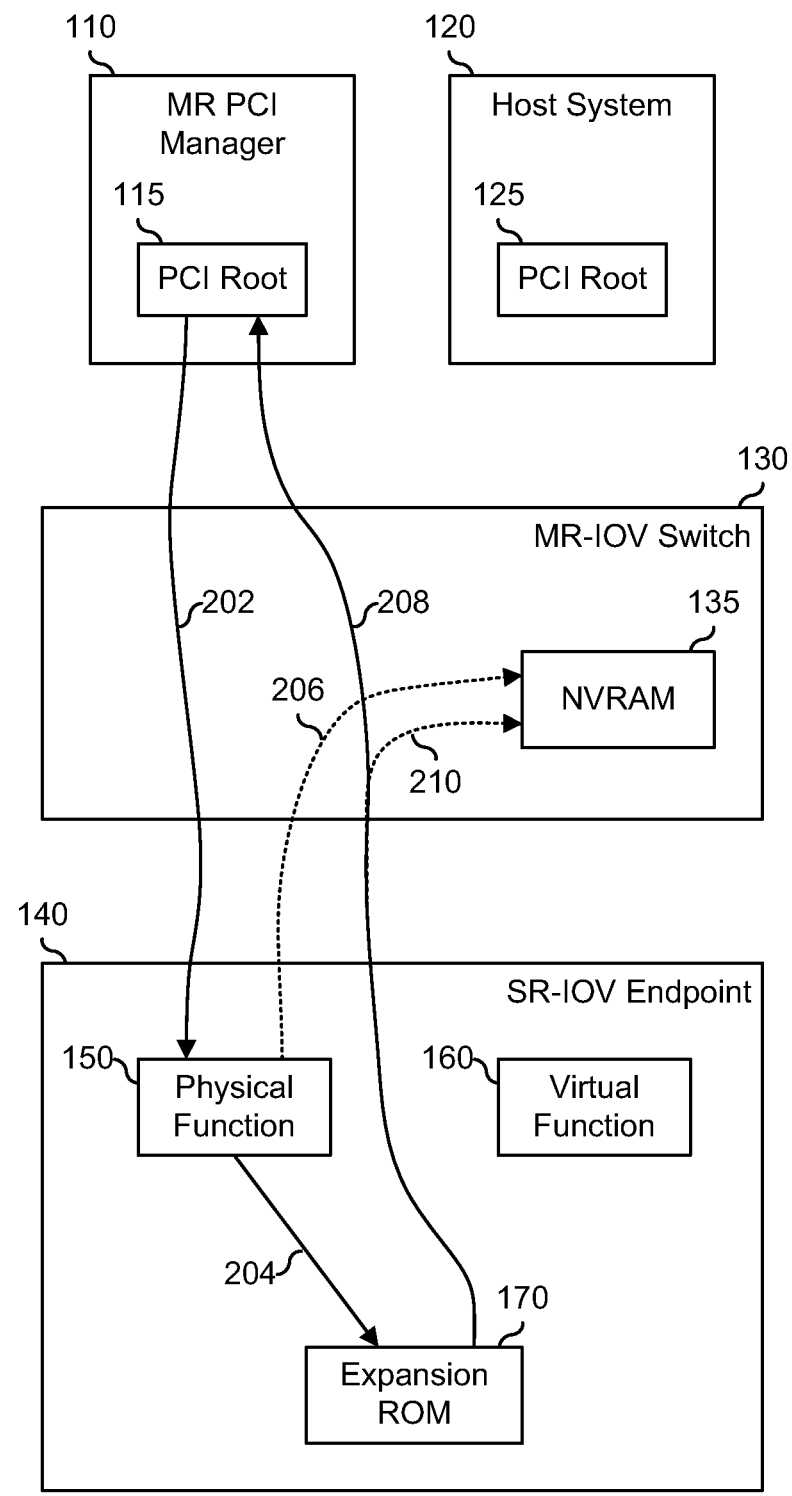
FIGS. 2 and 3 illustrate methods for loading firmware code in the virtualized environment of FIG. 1.

FIG. 2 illustrates virtualized environment 100 and a method whereby MR-PCIM 110 reads the firmware code from expansion ROM 170. Here, PCI root complex 115 issues a transaction 202 to physical function 150 to determine the base address 204 for expansion ROM 170. When MR-IOV switch 130 detects transaction 202 to physical function 150, the MR-IOV switch 130 stores 206 the base address for expansion ROM 170 to NVRAM 135. PCI root complex 115 then reads 208 the firmware code from expansion ROM 170, in order to use the firmware code in future transactions with SR-IOV endpoint 140. When MR-IOV switch 130 detects read 208 of the firmware code from expansion ROM 170, the MR-IOV switch 130 stores 210 the firmware code to NVRAM 135.

Figure 3:
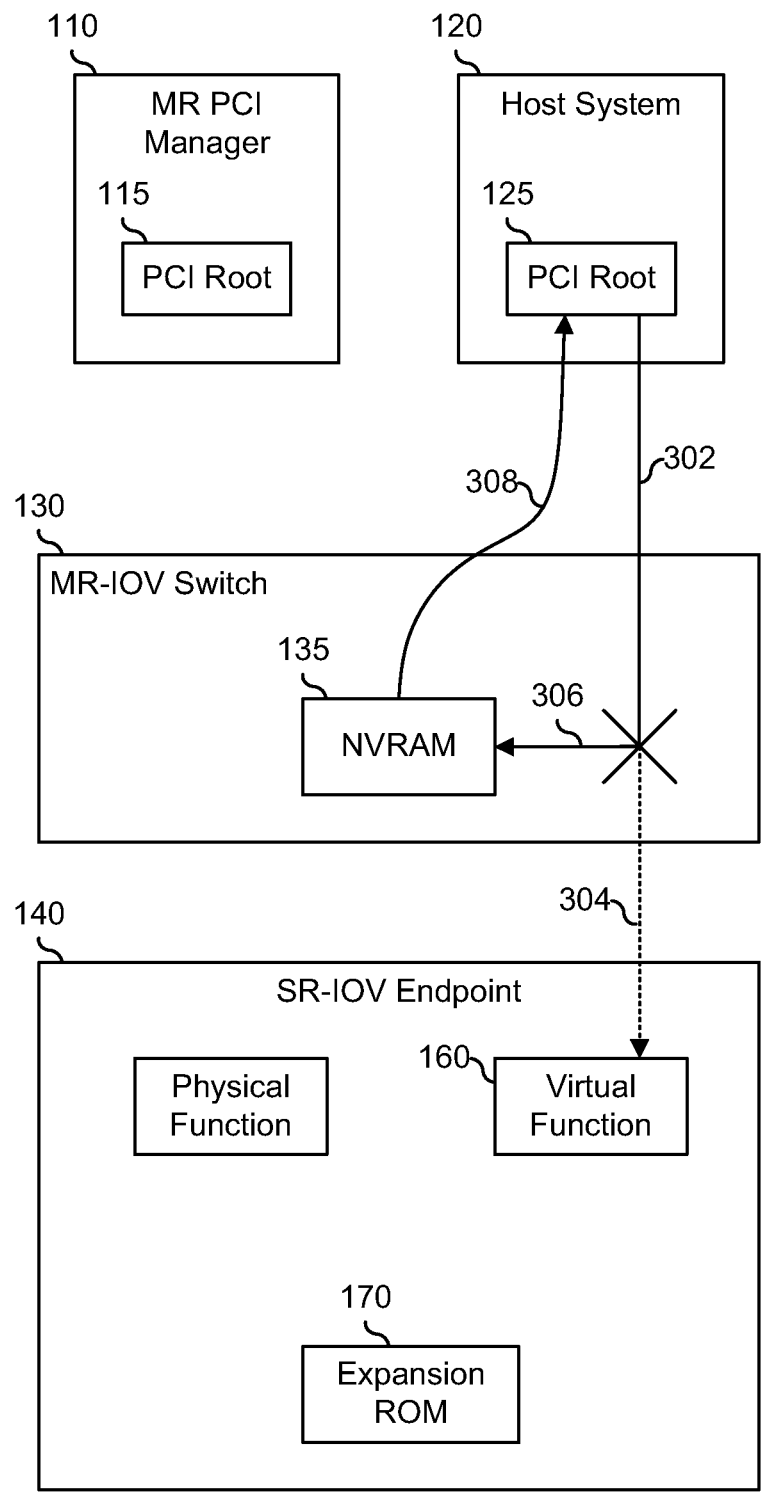

FIG. 3 illustrates virtualized environment 100 and a method whereby host system 120 obtains the firmware code from MR-IOV switch 130. Here, PCI root complex 125 issues a transaction 302 to virtual function 160 to determine the base address for expansion ROM 170. However, since virtual function 160 lacks access to PCI configuration space 152, SR-IOV endpoint 140 is unable to respond to transaction 302. Thus, when MR-IOV switch 130 detects transaction 302 to virtual function 160, blocks transaction 302 from being issued 304 to virtual function 160, traps transaction 302 and provides the trapped transaction 306 to provide a base address of the firmware code stored in NVRAM 135 to PCI root complex 125. PCI root complex 125 then reads 308 the firmware code from NVRAM 135, in order to use the firmware code in future transactions with SR-IOV endpoint 140. The skilled artisan will recognize that there are different ways in which MR-IOV switch 130 traps transactions and provides the base address for the firmware code to host system 120. For example, MR-IOV switch 130 can provide the base address of the firmware code in expansion ROM 170 to PCI root complex 125, and then can trap read transactions to that base address and instead point to the copy of the firmware code in NVRAM 135. In this way, all accesses to the firmware code subsequent to the initial read that is stored in NVRAM 135 are subsequently handled by MR-IOV switch 130, including reads from MR PCIM 110. In another example, MR-IOV switch 130 can provide the base address of the firmware code in NVRAM 135 to PCI root complex 125, and then can trap read transactions from host system 120 to that base address and then the read accesses from the host system will be directed to the NVRAM 135 without further transaction trapping. However, reads to expansion ROM 170 that are issued by MR-PCIM 110 would still be handled by the expansion ROM. After the firmware code is provided to host system 120, the host system can execute the firmware code to boot the host system and enable use of SR-IOV endpoint 140. As such, host system 120, which otherwise would be unable to access SR-IOV endpoint 140, can utilize the SR-IOV endpoint 140 by virtue of the copy of the firmware code copied on the host system. The skilled artisan will understand that, although virtual function 160 lacks access to expansion ROM 170, the virtual function can include a limited configuration space for controlling the virtual function.

Figure 4:
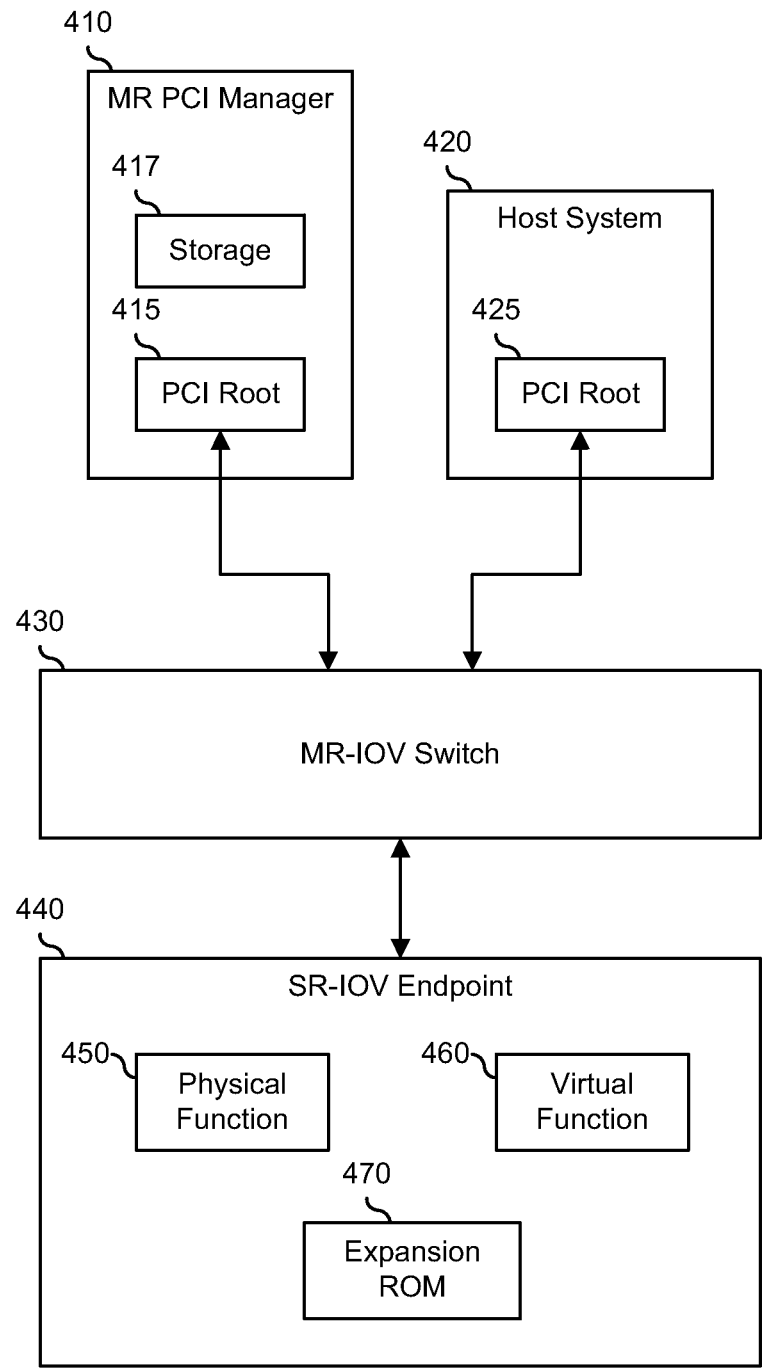
FIG. 4 is a block diagram illustrating a virtualized environment according to another embodiment of the present disclosure.

FIG. 4 illustrates an embodiment of a virtualized environment 400 including an MR-PCIM 410, one or more host system 420, an MR-IOV switch 430, and an SR-IOV endpoint 440. MR-PCIM 410 includes a PCI root complex 415 that is operable to connect a processor complex of MR-PCIM 410 to a PCI Express (PCIe) switch fabric such as MR-IOV switch 430, and thereby to gain access to the functionality of SR-IOV endpoint 440. MR-PCIM 410 also includes a storage device 417 for storing expansion ROM firmware from SR-IOV endpoint 440, as described further, below. SR-IOV endpoint 440 is similar to SR-IOV endpoint 140, and includes similar elements, including a physical function 450, a virtual function 460, and an expansion ROM 470.

Virtualized environment 400 operates similarly to virtualized environment 100. In particular, when PCI root complex 415 accesses the firmware code stored in expansion ROM 470, MR-PCIM 410 stores the firmware code in storage device 417, and MR-IOV switch 430 stores the base address for the firmware code. Subsequently, when host system 420 attempts to read the firmware code, MR-IOV switch 430 traps the transaction and issues the transaction to be serviced by MR-PCIM 410. In this way, host system 420 obtains access to the firmware code stored in expansion ROM 470, in spite of the fact that virtual function 460 does not provide a native ability to access the firmware code.

Figure 5:
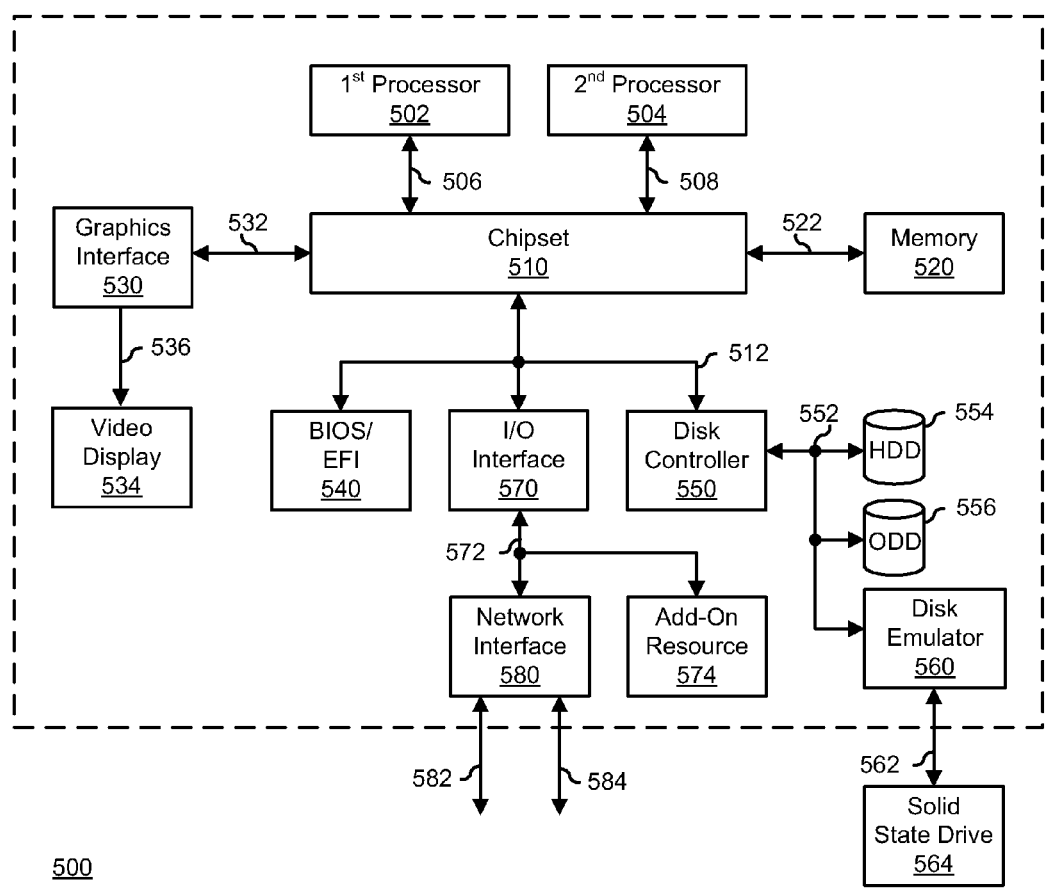
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A Peripheral Component Interconnect-Express (PCIe) switch comprising:
a memory to store a first base address in an endpoint device, wherein the first base address points to a first location of firmware code in the endpoint device; and
a processor that:
receives a first transaction from a first information handling system to a physical function of an endpoint device;
determines that the first information handling system can not access firmware code from the endpoint device, based upon the first transaction being to the first physical function;
determines that the first transaction is a first request to receive the firmware code from the endpoint device, and that the first transaction is issued to the first base address;
blocks the first transaction from being issued to the endpoint device;
receives a second transaction from the first information handling system to the second base address; and
provides the firmware code to the first information handling system from the memory in response to the second transaction, wherein in providing the firmware code, the processor further provides a second base address to the first information handling system, wherein the second base address points to a second location of the firmware code in the memory.

2. The PCIe switch of claim 1, wherein the first transaction is to a virtual function of the endpoint device.

3. The PCIe switch of claim 1, wherein the processor further:
prior to receiving the first transaction, receives a second transaction from a second information handling system to the physical function of the endpoint device;
determines that the second transaction is a second request to receive the firmware code from the endpoint device;
receives a third transaction from the endpoint device, the third transaction including the firmware code; and
stores the firmware code in the memory.

4. The PCIe switch of claim 3, wherein the processor further:
prior to receiving the third transaction, receives a fourth transaction from the endpoint device, the fourth transaction including a base address in the endpoint device, wherein the base address points to a location of the firmware code in the endpoint device; and
stores the base address in the memory.

5. The PCIe switch of claim 3, wherein the second transaction is to a physical function of the endpoint device.

6. The PCIe switch of claim 1, wherein:
the PCIe switch is a multi-root I/O virtualization switch; and
the endpoint device is a single-root I/O virtualization endpoint device.

7. A Peripheral Component Interconnect-Express (PCIe) switch comprising:
a memory; and
a processor that:
receives a first transaction from a first information handling system to a physical function of an endpoint device;
determines that the first information handling system can access firmware code from the endpoint device, based upon the first transaction being to the first physical function;
determines that the first transaction is a first request to receive firmware code from the endpoint device;
receives a second transaction from the endpoint device, the second transaction including the firmware code;
stores the firmware code in the memory;
receives a third transaction from the endpoint device, the third transaction including a first base address in the endpoint device, wherein the first base address points to a first location of the firmware code in the endpoint device;
stores the first base address in the memory;
receives a fourth transaction from a second information handling system to an endpoint device;
determines that the fourth transaction is a second request to receive firmware code from the endpoint device;
blocks the fourth transaction from being issued to the endpoint device; and
provides the firmware code to the second information handling system from the memory.

8. The PCIe switch of claim 7, wherein the fourth transaction is to a virtual function of the endpoint device.

9. The PCIe switch of claim 7, wherein in determining that the fourth transaction is a request to receive the firmware code from the endpoint device, the processor further determines that the fourth transaction is issued to the first base address.

10. The PCIe switch of claim 9, wherein:
in providing the firmware code to the second information handling system, the processor further:
provides a second base address to the first information handling system, wherein the second base address points to a second location of the firmware code in the memory; and receives a fifth transaction from the first information handling system to the second base address; and
providing the firmware code to the second information handling system is in response to the fifth transaction.

11. The PCIe switch of claim 7, wherein the first transaction is to a physical function of the endpoint device.

12. The PCIe switch of claim 7, wherein:
the PCIe switch is a multi-root I/O virtualization switch; and
the endpoint device is a single-root I/O virtualization endpoint device.

13. A method comprising:
receiving, at a Peripheral Component Interconnect-Express (PCIe) switch, a first transaction from a first information handling system to a physical function of an endpoint device;
determining that the first information handling system can not access firmware code from the endpoint device, based upon the first transaction being to the first physical function;
determining that the first transaction is a first request to receive firmware code from the endpoint device, wherein the determining includes determining that the first transaction is issued to a first base address in the endpoint device, wherein the first base address points to a first location of the firmware code in the endpoint device;
blocking the first transaction from being issued to the endpoint device;
providing, in response to the second transaction, the firmware code to the first information handling system from a memory of the PCIe switch, wherein providing the firmware code includes:

providing a second base address to the first information handling system, wherein the second base address points to a second location of the firmware code in the memory; and receiving a second transaction from the first information handling system to the second base address.

14. The method of claim 13, further comprising:

prior to receiving the first transaction and the second transaction, receiving a third transaction from a second information handling system to the endpoint device;

determining that the third transaction is a second request to receive the firmware code from the endpoint device;

receiving a fourth transaction from the endpoint device, the fourth transaction including the firmware code; and storing the firmware code in the memory.

* * * * *